United States Patent
Diehl

(10) Patent No.: US 7,427,006 B2
(45) Date of Patent: Sep. 23, 2008

(54) PIPE TENSIONER MACHINE

(76) Inventor: Ottmar Diehl, 61 Sukhumvit 21/8 Moo 9, 20260 Pattaya (TH)

( * ) Notice: Subject to any disclaimer, the term of this patent is extended or adjusted under 35 U.S.C. 154(b) by 0 days.

(21) Appl. No.: 11/111,291

(22) Filed: Apr. 20, 2005

(65) Prior Publication Data

US 2006/0208245 A1 Sep. 21, 2006

(30) Foreign Application Priority Data

Mar. 21, 2005 (EP) .................................. 05006152

(51) Int. Cl.
B65H 20/00 (2006.01)
(52) U.S. Cl. .................... 226/172; 226/190; 226/176
(58) Field of Classification Search ................ 226/172, 226/173, 176, 190, 195; 405/168.3–168.4
See application file for complete search history.

(56) References Cited

U.S. PATENT DOCUMENTS

| | | | | |
|---|---|---|---|---|
| 1,759,105 A | * | 5/1930 | Evans ........................... 57/138 |
| 3,372,849 A | * | 3/1968 | Hall et al. ....................... 226/25 |
| 3,589,580 A | * | 6/1971 | Smulders ..................... 226/108 |
| 3,739,971 A | * | 6/1973 | Silvestri et al. .............. 226/172 |
| 4,521,132 A | * | 6/1985 | Isakson et al. .............. 405/166 |
| 4,792,075 A | * | 12/1988 | Umlauf ...................... 226/172 |
| 4,917,540 A | * | 4/1990 | Recalde .................... 405/168.3 |
| 5,188,271 A | * | 2/1993 | Dannatt ..................... 226/102 |
| 5,893,682 A | | 4/1999 | Oliveri ...................... 405/166 |
| 6,439,445 B1 | | 8/2002 | DeGroot et al. .............. 226/172 |
| 7,021,510 B2 | * | 4/2006 | Ellingson .................... 226/172 |
| 7,025,332 B2 | * | 4/2006 | Rincoe ....................... 254/126 |

FOREIGN PATENT DOCUMENTS

EP  0 296 272 A  12/1988

* cited by examiner

*Primary Examiner*—Evan H Langdon
(74) *Attorney, Agent, or Firm*—James R. Frederick; Ware Fressola Van Der Sluys & Adolphson LLP

(57) ABSTRACT

A pipe tensioner machine for offshore pipelaying operations comprises adjustable tension banks for the transfer of tension to the pipe string. Four tension banks (14, 16, 18 20) are provided in an angle of substantially 90 degrees to each other mounted inside a framework (12). The tension banks are movable along guides. The tension banks (14, 16, 18, 20) comprise revolving tracks (22) carrying traction pads (24) transmitting the squeeze force to the pipe (26). The lower tension banks (18, 20) are longer than the upper tension banks (14, 16).

8 Claims, 2 Drawing Sheets

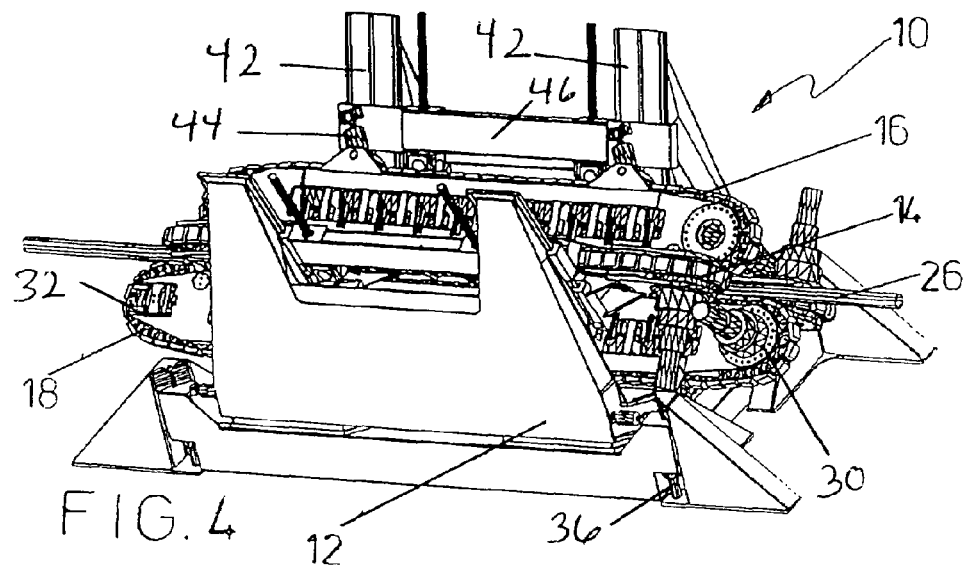
FIG. 4
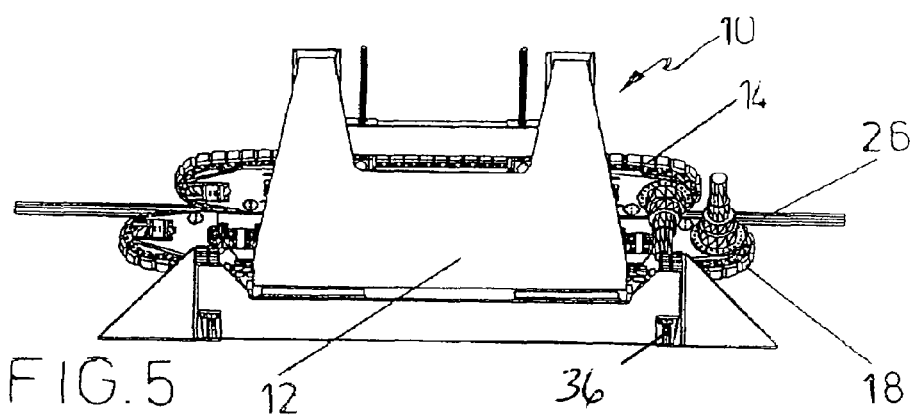
FIG. 5
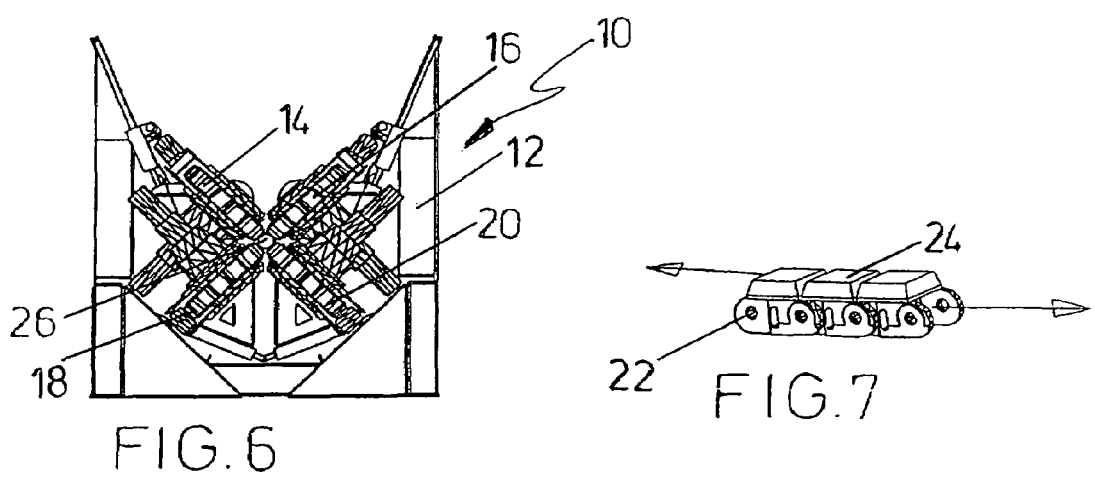
FIG. 6
FIG. 7

PIPE TENSIONER MACHINE

FIELD OF THE INVENTION

The present invention relates to a pipe tensioned machine for maintaining a predetermined tension of the pipe string between the pipe lay barge and seafloor during offshore pipe laying operations.

BACKGROUND OF THE INVENTION

In offshore pipe laying operations the pipe string between the lay barge and seafloor has to be kept taut to prevent overdue stress and buckling. The tension has to be maintained during all barge movements. For processing the pipe aboard the lay barge, the pipe string has to be kept steady, which means the pipe tension has to be kept within certain limits to compensate for the various sea conditions. The pipe string is squeezed between track loops or wheels which are propelled and controlled automatically.

From EP 0 296 272 A1 there is known a pipe tensioned machine for offshore pipe laying operations comprising squeeze elements for transferring tension forces to the pipes as well as a driving structure for the squeeze elements where two top squeeze and two bottom squeeze tracks are provided which may be moved relative to each other by an adjustment device mounted within a frame structure. Although this device operates properly it does not take account of the fact that due to the weight of the pipe more drive torque can be applied on the bottom tracks, and further, that the top of the machine is obstructed and no protrusions, like valve stems, in the pipe string can pass.

Other pipe tensioned machines (SAS Gouda by) use two opposing clamping tracks which are arranged either in horizontal or vertical direction. These machines squeeze, however, the cross section of the pipe string to an oval, which is due to the 180 degree opposed squeeze force.

A further four track type of tensioned machines (Remacut) is only suited for small pipe string diameters.

Therefore, there is a long felt and unmet need for a more effective pipe tensioned machine overcoming the before mentioned disadvantages and short comings which is adaptable to very different pipe diameters transmitting a controlled squeeze force on the pipe string.

SUMMARY OF THE INVENTION

In accordance with the invention herein, a pipe tensioned machine for offshore piping operations has a frame structure and two top tension banks and two bottom tension banks mounted to the frame structure for transferring tension forces to a pipe string. The two bottom tension banks have tracks that are longer than the tracks of the two top tension tracks. An adjustment device is mounted to the frame structure for moving the tracks of the top tension banks relative to the tracks of the bottom tension banks and a driving structure is provided for the tracks of the tension banks. In this arrangement, more drive can be provided on the bottom tracks.

A further favorable feature of the invention is that the track length between the center of a drive sprocket and idler sprocket is fully engaged with the pipe. Air springs may be arranged for providing at least a substantial part of the squeeze force.

In accordance with another preferred embodiment, four hydraulic jacks are provided for supporting the frame. In accordance with a preferred embodiment of the invention two bottom tension banks are sliding on guides with a 22.5° angle with respect to horizontal. In accordance with this embodiment two top tension banks are sliding on guides with a 22.5° angle with respect to vertical. Favorably, hydraulic cylinders push the two top tension banks against the pipe. According to a most preferred embodiment of the present invention these hydraulic cylinders are tilted in a forward direction.

Also according to the invention the two top tension banks slide up and down on a narrow "V" guide with preferable 45 degree in between the legs of the "V". The two bottom tension banks slide on a wide "V" guide with preferable 135 degrees in between the legs of the "V." Nevertheless the invention is not limited to these values and all other angles may be suited.

BRIEF DESCRIPTION OF THE DRAWINGS

The accompanying drawings which form a part of the specification illustrate several key embodiments of the present invention. The drawings and description together serve to fully explain the invention. In the drawings:

FIG. 4 is a perspective view of a pipe tensioned machine according to the present invention handling an 8" diameter pipe, FIG. 5 is a side view of the machine depicted in FIG. 4, FIG. 6 a front view of the machine depicted in FIG. 4 and FIG. 7 is a perspective view of a part of a track chain with pads according to the present invention.

DETAILED DESCRIPTION OF THE PREFERRED EMBODIMENTS

Figure 1:
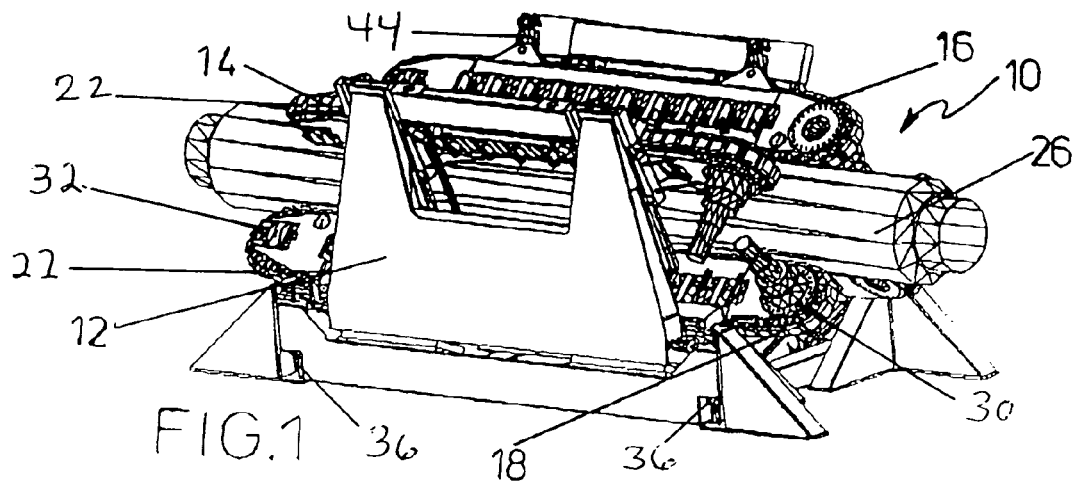
FIG. 1 is a perspective view of the pipe tensioned machine according to the present invention handling a 60" diameter pipe.
Figure 2:
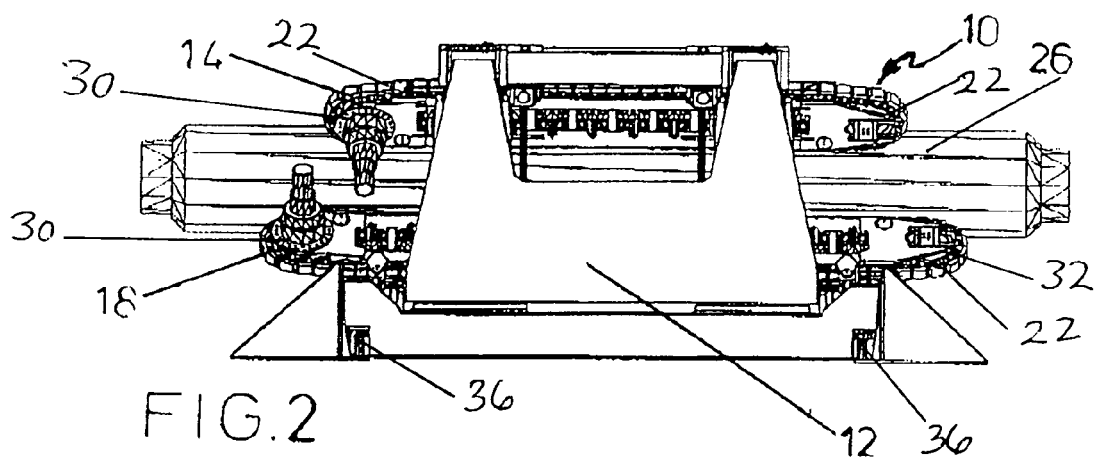
FIG. 2 is a side view of the machine depicted in FIG. 1.
Figure 3:
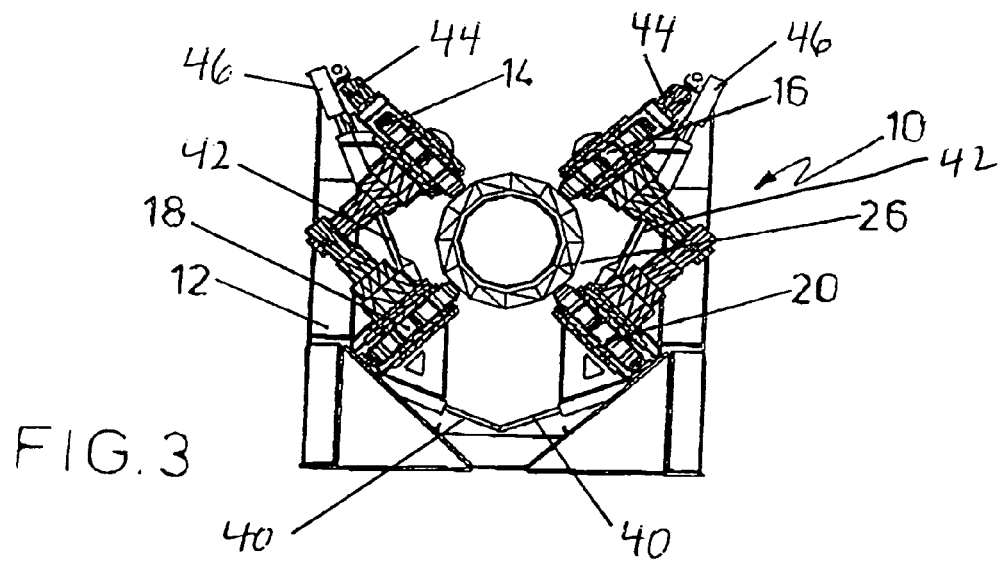
FIG. 3 is a front view of the machine depicted in FIG. 1.

Referring now to the drawings were like numerals denote like elements FIGS. 1 to 3 show a pipe tensioned machine according to the invention which is in general identified by reference numeral 10. Within a frame work 12 there are mounted two upper tension banks 14, 16 and two lower tension banks 18, 20. The tension banks include revolving track chains 22 provided with traction pads 24 for engagement with the pipe string 26 to be handled (see FIG. 7). As may be taken from the drawings the two bottom tension banks 18, 20 are longer than the top two tension banks 14, 16 to utilize the pipe weight for additional traction.

Referring now to FIGS. 4 to 6 the same show a pipe tensioned machine 10 handling an 8" diameter pipe string 26. The same as with the pipe tensioned machine depicted in FIGS. 1 to 3 there is also a framework 12 for mounting the two upper tension banks 14, 16 as well as the two lower tension banks 18, 20.

As mentioned before the two bottom tension banks 18, 20 are longer than the two top tension banks 14, 16 to utilize the pipe weight for traction. Thirty tons pipe weight for instance translate into 15 tons (30 kips) more tension. The bottom tension banks 18, 20 therefore provide more drive torque. Furthermore, interference of the drive motors is avoided. The length of tracks 22 between center of drive sprockets 30 and center of idler sprockets 32 is fully engaged with the pipe 26. The drive sprockets and drive motors provide a driving structure for the pipe machine 10.

The machine 10 can adapt to any pipe string angle in the over bend region, i.e. the machine can be used at the end of the production line. 15% of the squeeze force per tension banks are provided by the drive sprocket with the adjacent chain track and the idler sprocket with the adjacent chain track. Said sprockets and chain tracks also do the guiding of the tension banks relative to the pipe string. Air springs provide the remaining 85% squeeze.

When laying stiff pipe the machine 10, which is supported by four hydraulic jacks 36, will adapt the two bottom tension banks 18, 20 to the pipe string. When laying light pipe the machine can be locked in place to suite the present over bend and let the pipe string adapt to the machine.

The two bottom tension banks 18, 20 are sliding on guides 40 with a 22.5° angle with respect to horizontal, thus maintaining for any pipe diameter a constant bottom of pipe position. During operation those two banks are fixed in place. The two top tension banks 14, 16 are sliding on guide 42 with a 22.5° angle with respect to vertical, thus guaranteeing at each pipe diameter symmetry and a 90° spaced pipe squeeze by the tension banks.

The two top tension banks 14, 16 are sliding in their guides 42 and are pushed against the pipe by hydraulic cylinders 44 thus making up for differences in pipe string diameter and providing squeeze. Said hydraulic cylinders 44 are reacting against a strong back 46 of frame 12 which is moved up and down by jack screws. Said cylinders are tilted forward to take the tension load from the guides.

Valve stems protruding from the top of the pipeline or flow meter connections protruding from the side of the pipeline can pass the machine 10 under full tension. When laying pipe down in "S" configuration the two top tension banks 14, 16 are moved further up to make room for the pulling head which lifts off due to lack of weight. Under 8" pipe diameter two opposing tension banks are used while remaining two tension banks are locked and carry guide rollers. The tensioned machine is changed over to a different pipe diameter in a very short time. Low track tension is needed to keep pads 24 engaged with pipe string, since the distance between the center of track pin and the contact area of traction pad 24 is as narrow as possible, and therefore wear and tear on track pins is low. The traction pads 24 have transverse play to facilitate moving outwardly while the track is engaged in the radius portion of the pipe string over bend. The two top guides 42 could be described as a narrow "V" and bottom guides as a wide "V".

While several embodiments of the present invention have been described in detail various modifications, alternations, changes and adaptations may be made without departing from the spirit and the scope of the present invention defined in the appended claims. It is intended that all such modifications, alternations and changes be considered part of the present invention.

The invention claimed is:

1. A pipe tensioner machine for offshore pipe laying operations, comprising:
   A) a frame structure;
   B) two top tension banks and two bottom tension banks mounted to the frame structure for transferring tension forces to a pipe string, said top tension banks having tracks and said bottom tension banks having tracks that are longer than the tracks of the top tension banks;
   C) an adjustment device mounted to the frame structure for moving the tracks of the top tension banks relative to the tracks of the bottom tension banks, the adjustment device having
      1) first guides slidingly mounting the two top tension banks, said first guides arranged in the form of a narrow "V" with a 45° angle between the guides, and
      2) second guides slidingly mounting the two bottom tension banks, said second guides arranged in the form of a wide "V" with a 135° angle between the guides; and
   D) a driving structure for the tracks of the tension banks.

2. A pipe tensioner machine according to claim 1, wherein the driving structure includes a drive sprocket and an idler sprocket supporting the tracks of each tension bank, and the track length between the centers of the drive sprocket and idler sprocket is fully engaged with the pipe string.

3. A pipe tensioner machine according to claim 1, and further comprising:
   E) hydraulic jacks supporting the frame structure during operation of the machine.

4. A pipe tensioner machine according to claim 3, wherein four hydraulic jacks are provided for supporting the frame structure.

5. A pipe tensioner machine according to claim 1, wherein the second guides slidingly mounting the bottom tension banks are each at an angle of about 22.5 degrees with respect to horizontal.

6. A pipe tensioner machine according to claim 1, wherein the first guides slidingly mounting, the two top tension banks are each at an angle of about 22.5 degrees with respect to vertical.

7. A pipe tensioner machine according to claim 6, and further comprising a plurality of hydraulic cylinders mounted for pushing the top tension banks against the pipe string.

8. A pipe tensioner machine according to claim 7, wherein said plurality of cylinders are tilted in a forward direction.

\* \* \* \* \*

UNITED STATES PATENT AND TRADEMARK OFFICE
CERTIFICATE OF CORRECTION

PATENT NO.        : 7,427,006 B2                                          Page 1 of 1
APPLICATION NO. : 11/111291
DATED             : September 23, 2008
INVENTOR(S)       : Ottmar Diehl It is certified that error appears in the above-identified patent and that said Letters Patent is hereby corrected as shown below:

In column 1, line 5, "tensioned" should be --tensioner--
In column 1, line 21, "tensioned" should be --tensioner--
In column 1, line 33, "tensioned" should be --tensioner--
In column 1, line 33, "by" should be --bv--
In column 1, line 38, "tensioned" should be --tensioner--
In column 1, line 41, "tensioned" should be --tensioner--
In column 1, line 48, "tensioned" should be --tensioner--
In column 2, line 20, "tensioned" should be --tensioner--
In column 2, line 25, "tensioned" should be --tensioner--
In column 2, line 37, "tensioned" should be --tensioner--
In column 2, line 47, "tensioned" should be --tensioner--
In column 2, line 49, "tensioned" should be --tensioner--
In column 3, line 31, "tensioned" should be --tensioner--
In column 4, line 35, claim 5, line 2 before "bottom" --two-- should be inserted Signed and Sealed this Fourteenth Day of April, 2009

JOHN DOLL
*Acting Director of the United States Patent and Trademark Office*